US007793054B2

(12) United States Patent
Terai (10) Patent No.: US 7,793,054 B2
(45) Date of Patent: Sep. 7, 2010

(54) DVD PLAYER AND ELECTRONIC DEVICE (75) Inventor: Hiroshi Terai, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1424 days.

(21) Appl. No.: 11/135,464

(22) Filed: May 24, 2005

(65) Prior Publication Data
US 2005/0271369 A1 Dec. 8, 2005

(30) Foreign Application Priority Data
Jun. 2, 2004 (JP) .............................. 2004-164048

(51) Int. Cl.
G06F 13/00 (2006.01)
G06F 13/28 (2006.01)
H04N 5/00 (2006.01)
(52) U.S. Cl. ...................... 711/154; 711/103; 711/162; 711/E12.008; 386/125; 386/126
(58) Field of Classification Search ................... None
See application file for complete search history.

(56) References Cited
U.S. PATENT DOCUMENTS
5,365,466 A * 11/1994 Hazard ....................... 708/250

| 6,640,334 | B1 * | 10/2003 | Rasmussen ................ 717/171 |
| 6,928,595 | B2 | 8/2005 | Takahashi et al. ........... 714/718 |
| 7,068,922 | B2 * | 6/2006 | Murata ....................... 386/125 |
| 2003/0063896 | A1 * | 4/2003 | Gonzalez Tovar et al. ..... 386/94 |
| 2007/0192532 | A1 * | 8/2007 | Ogle ........................... 711/103 |

FOREIGN PATENT DOCUMENTS
JP 2002-366432 12/2002
JP 2003-058417 2/2003

* cited by examiner

Primary Examiner—Reginald G Bragdon
Assistant Examiner—Eric S Cardwell
(74) Attorney, Agent, or Firm—Bacon & Thomas, PLLC (57) ABSTRACT The present invention discloses a technique for updating information with respect to a DVD player, for example. When information to be updated such as a password for a parental lock or type of language is to be modified, the information to be updated is written into a free space within an area of the flash memory. Further, when the control delay becomes unnoticeable, information last written in the area of the flash memory is read out to be written into a temporary storage while the area of the flash memory is cleared. Then, the updated information in the temporary storage is written into the cleared area of the flash memory.

4 Claims, 5 Drawing Sheets

DVD PLAYER AND ELECTRONIC DEVICE

BACKGROUND OF THE INVENTION

1. Field of the Invention

The present invention relates to an electronic device in which information, the content of which is required to be held even in a power-off state, is stored in a flash memory, and more specifically to a DVD player and an electronic device in which a flash memory is cleared while the control delay is unnoticeable.

2. Description of the Prior Art

Some kinds of household electrical appliances need to hold data even in a power-off state, and DVD players can be cited as one of these kinds of household electrical appliances. That is, in a DVD player, it is necessary to hold the content of setup information such as the type of language to be reproduced, the type and/or appearance of subtitle, the method of audio output, and the password for parental lock, even in a power-off state. Thus, setup information is adapted to be stored in a nonvolatile element. However, it is necessary to provide an EEPROM separately if employed as a nonvolatile element, resulting in an increase of hardware. Hence, one block in a flash memory, in which control programs are stored, is allocated as a storage area for setup information to eliminate the use of an EEPROM (hereinafter referred to as first prior art).

The following technique has also been proposed (hereinafter referred to as second prior art). That is, the technique is arranged in such a manner that a storage device including a nonvolatile storage medium is found to be composed of logical blocks when viewed externally, while that the logical blocks are coordinated against physical blocks (blocks in the nonvolatile storage medium) internally. It is then disclosed that when erasing data, logical blocks are first cleared, while actual physical blocks are not required to be cleared immediately after the logical clearing but may be left uncleared to be cleared on another event. It is also disclosed that if only a small number of partial logical blocks are used among eight ones obtained by dividing one physical block, data in the partial logical blocks used is transferred to another physical block to subsequently clear the original physical block to avoid accumulating invalid data and thereby running out of free space (refer to Japanese Patent Laid-Open Publication No. 2003-58417 (paragraphs 0030 and 0036 through 0038) for example).

The following technique has further been proposed (hereinafter referred to as third prior art). That is, the technique is arranged in such a manner that when it is required to keep data in a mobile phone, the data to be kept is stored in a cache memory. Then, when the mobile phone is put into a standby mode, the data stored in the cache memory is transferred to a flash memory. It is also disclosed that the standby mode means that the mobile phone is neither under communication nor under key-in operation, and that no other processing is performed (refer to Japanese Patent Laid-Open Publication No. 2002-366432 (paragraphs 0015 through 0023) for example).

However, employing the first prior art suffers from the following problem. That is, when the content of setup information is updated, an appropriate block in the flash memory should be cleared to write the updated setup information therein. Meanwhile, clearing operation in flash memories is time-consuming, and therefore when setup information is updated, the speed of processing to be performed in parallel therewith is reduced, resulting in poor operational comfort.

Meanwhile, employing the second prior art allows the problem of the first prior art to be solved. However, in order to arrange that the storage device including the nonvolatile storage medium be found to be composed of logical blocks when viewed externally, it is necessary to coordinate the logical blocks against the physical blocks internally. Then, in order to make it possible to coordinate physical blocks of a flash memory against logical blocks, it is necessary to keep data indicating the correspondence of the logical blocks and the physical blocks even in a power-off state. Thus, a nonvolatile element for storing the correspondence is required. It is also required that this nonvolatile element does not take a lot of time to be cleared and is not a flash memory. Therefore, when applying the second prior art, the problem solved by the first prior art, that is, the problem of an unnecessary EEPROM emerges again.

Also, applying the third prior art to a DVD player, which uses a commercial power supply as its primary power supply, suffers from the following problem. That is, in the case of using a commercial power supply as the primary power supply, there may be a power failure before transferring data stored in the cache memory to the flash memory. Then, in the case of a power failure at such a time, setup information stored in the cache memory, that is, updated setup information is to be lost without being transferred to the flash memory.

SUMMARY OF THE INVENTION

The present invention has been made to solve the above-described problems, and an object thereof is to provide an electronic device capable of preventing the increase in hardware size and the loss of information due to power failure even when avoiding, most preferably, the occurrence of an event that the operational comfort may be lost when setup information is modified; eliminating the use of a pointer for indicating the storage position of setup information even in a power-off state; and avoiding the complexity of control even when eliminating the use of a pointer required to be kept even in a power-off state.

It is another object of the present invention to provide an electronic device capable of preventing the increase in hardware size and the loss of information due to power failure even when avoiding the occurrence of an event that the control delay may be noticeable, that is, the operational comfort may be lost when to-be-held information is modified, with the arrangement that when to-be-held information is modified, the modified to-be-held information is written into a free space without erasing to-be-held information that has already been stored, and when the control delay becomes unnoticeable, last-written to-be-held information is read out to be written into temporary storage means, while the to-be-held information area is cleared, and then the to-be-held information written in the temporary storage means is written into the cleared to-be-held information area.

In addition to the above-described objects, it is still another object to provide an electronic device capable of eliminating the use of a pointer for indicating the position where to-be-held information is last written and thereby the use of storage means for storing a pointer even in a power off state, with the arrangement that the to-be-held information area for writing to-be-held information therein is divided into a plurality of unit areas, the unit areas being ordered, and a unit area, in which to-be-held information is to be written, is moved in accordance with the ordering for each write of to-be-held information, and then after clearing the to-be-held information area, to-be-held information is written into a unit area ordered first by the ordering.

In addition to the above-described objects, it is a further object to provide an electronic device capable of avoiding the complexity of control even when eliminating the use of a pointer required to be kept even in a power-off state, with the arrangement that once data read out of a predetermined position in a unit area indicates a cleared state, it is determined that to-be-held information stored in the unit area that has been subject to reading most recently is required to be kept.

In order to solve the above-described problems, a DVD player according to the present invention comprises: a flash memory in which a to-be-held information area capable of storing a plurality of setup information, the content of which is required to be held even in a power-off state, is provided; temporary storage means for storing data temporarily; and control means for controlling the operation as a device. Then, the DVD player further comprises: information management means whereby, when setup information is modified, the modified setup information is written into a free space within the to-be-held information area without erasing setup information that has already been stored in the to-be-held information area; and area recovery means whereby, when becoming a standby state, setup information last written in the to-be-held information area by the information management means is read out to be written into the temporary storage means, while the to-be-held information area is cleared, and then the setup information written in the temporary storage means is written into the cleared to-be-held information area, wherein the to-be-held information area is divided into a plurality of unit areas, the unit areas being ordered in either ascending or descending order of address; the information management means moves a unit area, in which setup information is to be written, in accordance with the ordering for each write of setup information; the area recovery means writes the setup information written in the temporary storage means into a unit area ordered first by the ordering within the cleared to-be-held information area; and the area recovery means reads data out of a predetermined position in a unit area in the order according to the ordering until readout data indicates a cleared state, and once data indicating a cleared state is read out, it is determined that setup information stored in the unit area that has been subject to reading most recently is the setup information last written in the to-be-held information area by the information management means.

That is, the control delay cannot be seen from outside the device in a standby state. Setup information required to be held is kept in the to-be-held information area even when there is a power failure before clearing the to-be-held information area to write the setup information therein. Also, since no other information (e.g. data for coordinating logical addresses against physical addresses) is used, no nonvolatile storage element for storing such information is required. In addition, it is possible to find a unit area where setup information is last written only by checking, in accordance with the ordering, whether unit areas are in a state of being left cleared or provided with information. Also, the state where the area recovery means has cleared the to-be-held information area and has written setup information therein means that the to-be-held information area is initialized. Further, it is possible to find setup information required to be kept only by checking unit areas in accordance with the ordering.

Also, an electronic device according to the present invention comprises: a flash memory in which a to-be-held information area capable of storing a plurality of to-be-held information, the content of which is required to be held even in a power-off state, is provided; temporary storage means for storing data temporarily; and control means for controlling the operation as a device. Then, the electronic device further comprises: information management means whereby, when to-be-held information is modified, the modified to-be-held information is written into a free space within the to-be-held information area without erasing to-be-held information that has already been stored in the to-be-held information area; and area recovery means whereby, when the control delay of the control means becomes unnoticeable, to-be-held information last written in the to-be-held information area by the information management means is read out to be written into the temporary storage means, while the to-be-held information area is cleared, and then the to-be-held information written in the temporary storage means is written into the cleared to-be-held information area.

That is, to-be-held information required to be held is kept in the to-be-held information area even when there is a power failure before clearing the to-be-held information area to write the to-be-held information therein. Also, since no other information (e.g. data for coordinating logical addresses against physical addresses) is used, no nonvolatile storage element for storing such information is required.

In addition to the above-described arrangement, the electronic device is adapted in such a manner that the to-be-held information area is divided into a plurality of unit areas, the unit areas being ordered in either ascending or descending order of address; the information management means moves a unit area, in which to-be-held information is to be written, in accordance with the ordering for each write of to-be-held information; and the area recovery means writes the to-be-held information written in the temporary storage means into a unit area ordered first by the ordering within the cleared to-be-held information area.

That is, it is possible to find a unit area where to-be-held information is last written only by checking, in accordance with the ordering, whether unit areas are in a state of being left cleared or provided with information. Also, the state where the area recovery means has cleared the to-be-held information area and has written to-be-held information therein means that the to-be-held information area is initialized.

In addition to the above-described arrangement, the electronic device is adapted in such a manner that the area recovery means reads data out of a predetermined position in a unit area in the order according to the ordering until readout data indicates a cleared state, and once data indicating a cleared state is read out, it is determined that to-be-held information stored in the unit area that has been subject to reading most recently is the to-be-held information last written in the to-be-held information area by the information management means. That is, it is possible to find to-be-held information required to be kept only by checking unit areas in accordance with the ordering.

In accordance with the present invention, the to-be-held information area is cleared in a standby state, i.e., the state where the control delay cannot be seen externally. Setup information required to be held is kept in the to-be-held information area even when there is a power failure before clearing the to-be-held information area to write the setup information therein. Also, since no other information is used, no nonvolatile storage element for storing such information is required. In addition, it is possible to find a unit area where setup information is last written only by checking, in accordance with the ordering, whether unit areas are in a state of being left cleared or provided with information. Also, the state where the area recovery means has cleared the to-be-held information area and has written setup information therein means that the to-be-held information area is initialized. Further, it is possible to find setup information required to be kept only by checking unit areas in accordance with the ordering. Therefore, it is possible: to prevent the increase in hardware size and the loss of information due to power failure even when avoiding, most preferably, the occurrence of an event that the operational comfort may be lost when setup information is modified; to eliminate the use of a pointer for indicating the storage position of setup information even in a power-off state; and to avoid the complexity of control even when eliminating the use of a pointer required to be kept even in a power-off state.

Also in accordance with the present invention, to-be-held information required to be held is kept in the to-be-held information area even when there is a power failure before clearing the to-be-held information area to write the to-be-held information therein. Also, since no other information is used, no nonvolatile storage element for storing such information is required. Therefore, it is possible to prevent the increase in hardware size and the loss of information due to power failure even when avoiding the occurrence of an event that the control delay may be noticeable, that is, the operational comfort may be lost when to-be-held information is modified.

Further, it is possible to find a unit area where to-be-held information is last written only by checking, in accordance with the ordering, whether unit areas are in a state of being left cleared or provided with information. Also, the state where the area recovery means has cleared the to-be-held information area and has written to-be-held information therein means that the to-be-held information area is initialized. Therefore, it is possible to eliminate the use of storage means for storing a pointer even in a power-off state.

Furthermore, it is possible to find a unit area where to-be-held information required to be kept is written only by checking unit areas in accordance with the ordering. Therefore, it is possible to avoid the complexity of control even when eliminating the use of a pointer required to be kept even in a power-off state.

DESCRIPTION OF THE PREFERRED EMBODIMENTS

Embodiments of the present invention will hereinafter be described with reference to the accompanying drawings.

Figure 1:
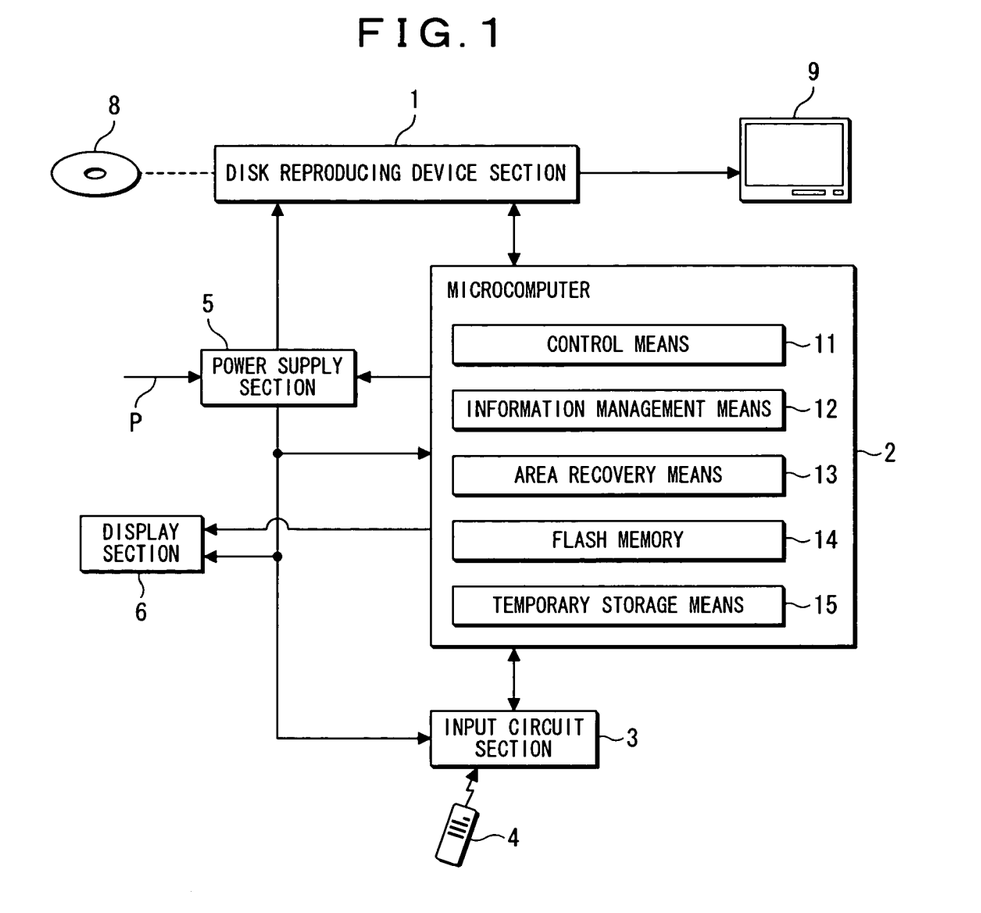
FIG. 1 is a block diagram showing the electrical configuration of a DVD player as an embodiment of an electronic device according to the present invention.

FIG. 1 is a block diagram showing the functional electrical configuration of an embodiment of an electronic device according to the present invention, and specifically a DVD player.

In FIG. 1, the disk reproducing device section 1 comprises: a pickup for reading out data recorded on a DVD 8; a signal processing section for processing a signal output from the pickup to output a program stream; and a decoding section for expanding the program stream and thereby demodulating a video signal to be displayed on a TV receiver 9, and performs main operations as a DVD player.

The input circuit section 3 comprises: a key switch such as a power key provided on the front panel of the device body not shown in the figure; and a light receiving unit for receiving infrared signal transmitted from a remote controller 4, wherein when a user's command is given, the command is output to the microcomputer 2. The display section 6 displays the number of title under reproduction, time information for indicating the reproducing position, etc. in accordance with commands from the control means 11. The power supply section 5 is a switching power supply, which uses a commercial power supply P as its primary input, supplying the disk reproducing device section 1, the microcomputer 2, the input circuit section 3, and the display section 6 with operating power.

Figure 2:
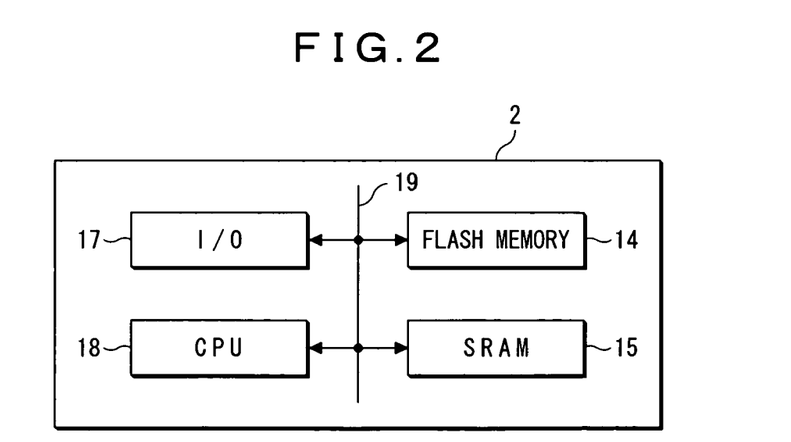
FIG. 2 is a block diagram showing the electrical hardware configuration of a microcomputer.

FIG. 2 is a block diagram showing the electrical hardware configuration of the microcomputer 2.

Figure 3:
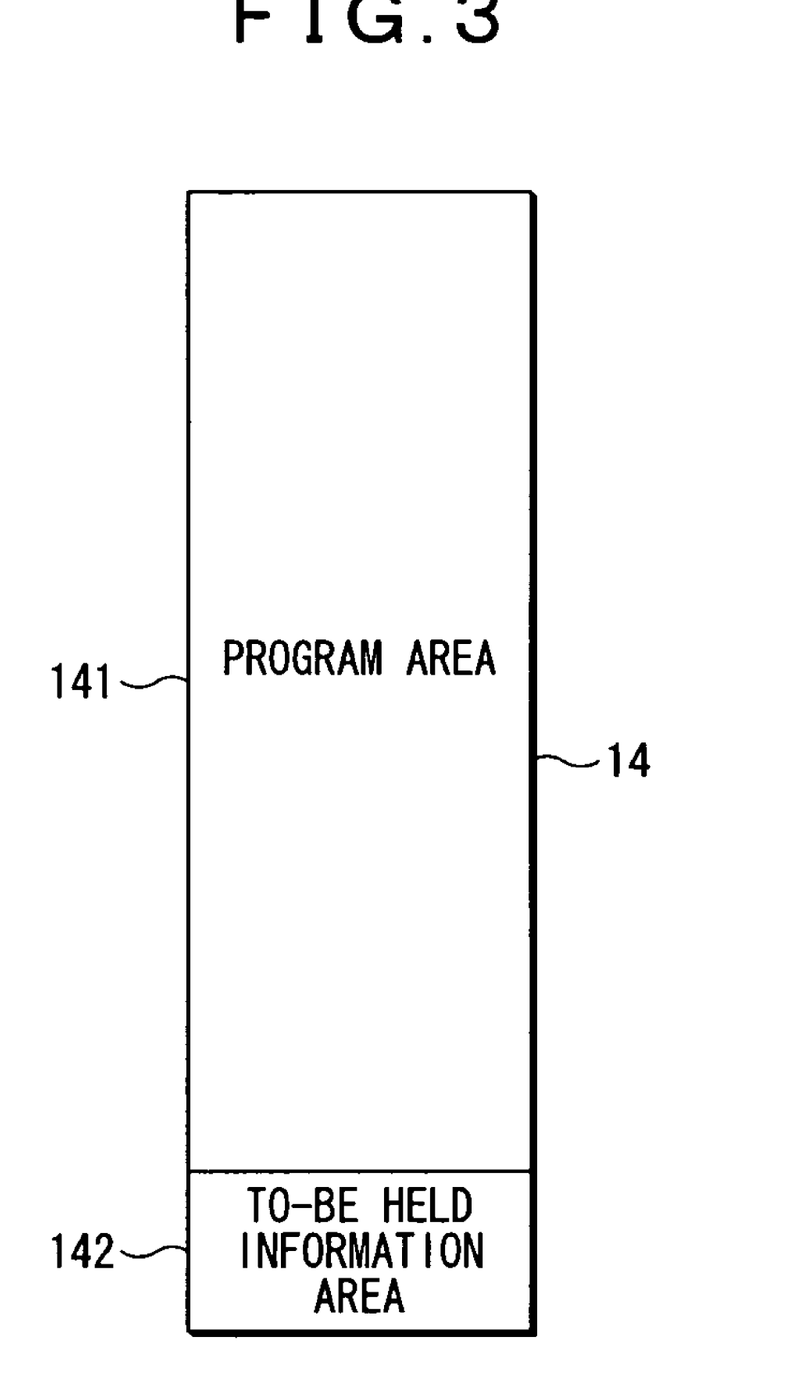
FIG. 3 is a view illustrating an area allocation of a flash memory.
Figure 4A:
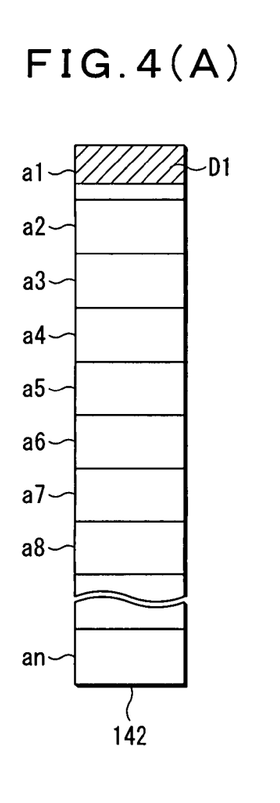
FIG. 4 is a view illustrating the shift of the position where setup information (to-be-held information) is written within a to-be-held information area.
Figure 4B:
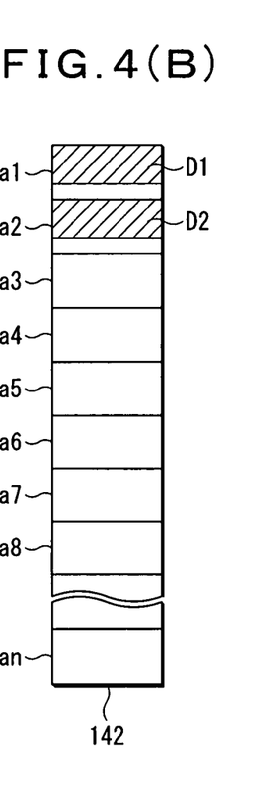
Figure 4C:
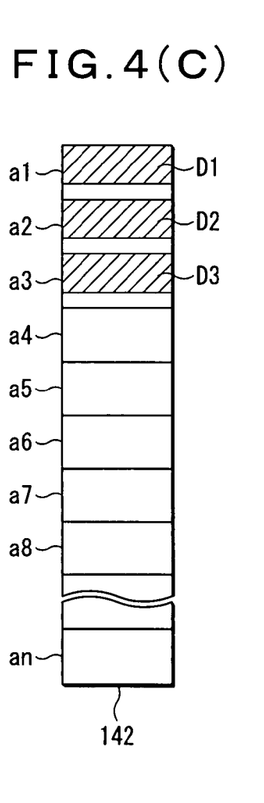
Figure 4D:
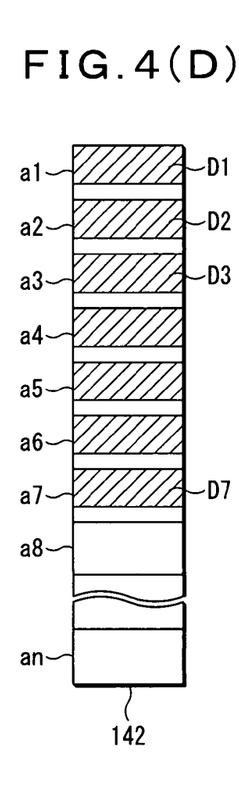
Figure 4E:
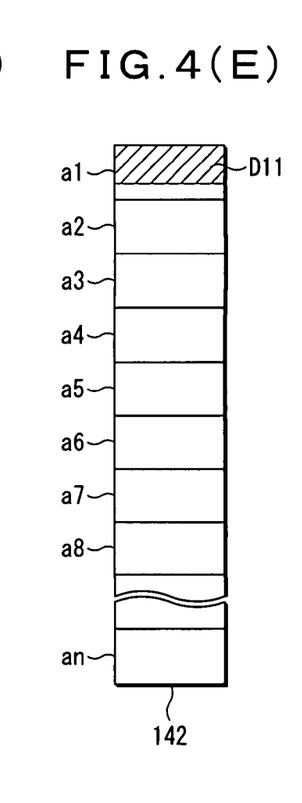

A flash memory 14, an SRAM 15, an input/output circuit (hereinafter referred to as I/O) 17, and a CPU 18 are connected with each other through a bus line 19 composed of an address bus, a data bus, and a control bus. Then, in the flash memory 14 are stored programs to be executed by the CPU 18 in advance. Also in the flash memory 14 is provided a to-be-held information area 142 separately from an area 141 for storing the programs as shown in FIG. 3 (to be hereinafter described in detail).

The SRAM 15 is a high-speed readable and writable static RAM, to which programs stored in the flash memory 14 are transferred. The SRAM 15 is also used for temporary data storage and constitutes the temporary storage means 15 shown in FIG. 1. The I/O 17 outputs data input from outside the microcomputer 2 to the CPU 18, and also sends data output from the CPU 18 outside the microcomputer 2.

The CPU 18 transfers, if necessary, part of the programs stored in the flash memory 14 to the SRAM 15, and then executes the programs transferred to the SRAM 15, constituting the control means 11, the information management means 12, and the area recovery means 13.

Returning to the description referring to FIG. 1, the control means 11 controls main operations as a DVD player. That is, if a command given through the remote controller 4, etc. indicates displaying the chapter list, the operation of the disk reproducing device section 1 is controlled to display thumbnail images for the respective chapters on the TV receiver 9. Also, if a command given through the remote controller 4, etc. indicates reproducing, the disk reproducing device section 1 is controlled to perform reproducing operation to display video signals recorded on the DVD 8 on the TV receiver 9.

In addition, when a power key (not shown in the figure) of the remote controller 4, etc. is operated in a power-on state, the control means 11 controls the power supply section 5 to keep supplying only the input circuit section 3 and part of the microcomputer 2 with operating power, while the other part with no operating power to shift to a standby state (power-off state described in each claim).

Here in respect to setup information, setup information corresponds to to-be-held information described in each claim, the content of which is required to be held even in a power-off state, including information for indicating various kinds of settings (e.g. the type of subtitle, screen size, the method of audio output) as a DVD player, and further including the password for parental lock, resume information (information for indicating the reproducing position where to next reproduce the DVD 8), etc.

The information management means 12 manages the above-described setup information. That is, when a user gives a command for modifying settings as a DVD player, a screen for modifying the settings (not shown in the figure) is displayed on the TV receiver 9. Then, the content of previous setup information is modified in accordance with the user's command (setup information last written in the to-be-held information area 142 of the flash memory 14 is read out to be written into the SRAM 15, and then the setup information thus written into the SRAM 15 is modified). Then, when the modification is finished, the modified setup information is additionally written into a free space within the to-be-held information area 142 without erasing setup information that has already been written in the to-be-held information area 142.

Here will be described the storage method, in detail, when the information management means 12 writes setup information (of less than 64 bytes for example) into the to-be-held information area 142.

The to-be-held information area (of 4 kilobytes, for example, in an actual device) 142 is divided into a plurality of unit areas (of 64 bytes, for example, in an actual device) "a1" to "an" as shown in FIG. 4. It is now assumed that the to-be-held information area 142 is in a state, as shown in FIG. 4 (B) for example, where setup information D1 and D2 are written, respectively, in the unit areas "a1" and "a2". When the setup information is modified in such a state, the information management means 12 writes the modified setup information into one of the free spaces ("a3" to "an") without erasing the setup information D1 and D2.

To be in more detail, the unit areas "a1" to "an", in which setup information is to be written, are ordered in ascending order of address (the areas may also be ordered in descending order of address). Then, a unit area, in which setup information is to be written, is moved in accordance with the ordering for each storing of setup information. Therefore, if two pieces of setup information D1 and D2 have already been written, the current setup information (represented by D3) is written, as shown in FIG. 4 (C), into the unit area "a3" that follows the unit area "a2", in which the setup information D2 has been written, in ascending order of address.

When a command for the shift from a power-on state to a power-off state is given through the remote controller 4, the area recovery means 13 reads out setup information last written in the to-be-held information area 142 among setup information written in the to-be-held information area 142 by the information management means 12 to write the setup information into the temporary storage means 15, and then clears the to-be-held information area 142. Next, when the to-be-held information area 142 has been cleared, the setup information written in the temporary storage means 15 is written into a unit area ordered first by the ordering, that is, in the unit area "a1".

It is noted that when reading out setup information last written by the information management means 12, the area recovery means 13 reads data out of a predetermined position (in the present embodiment, the head address of each unit area) in the unit areas starting from the second one "a2" to "an" in the order according to the ordering until readout data indicates a cleared state (FF in hexadecimal). Then, once readout data indicates a cleared state (FF in hexadecimal), it is determined that setup information stored in the unit area that has been subject to reading most recently is the setup information last written in the to-be-held information area 142 by the information management means 12.

Figure 5:
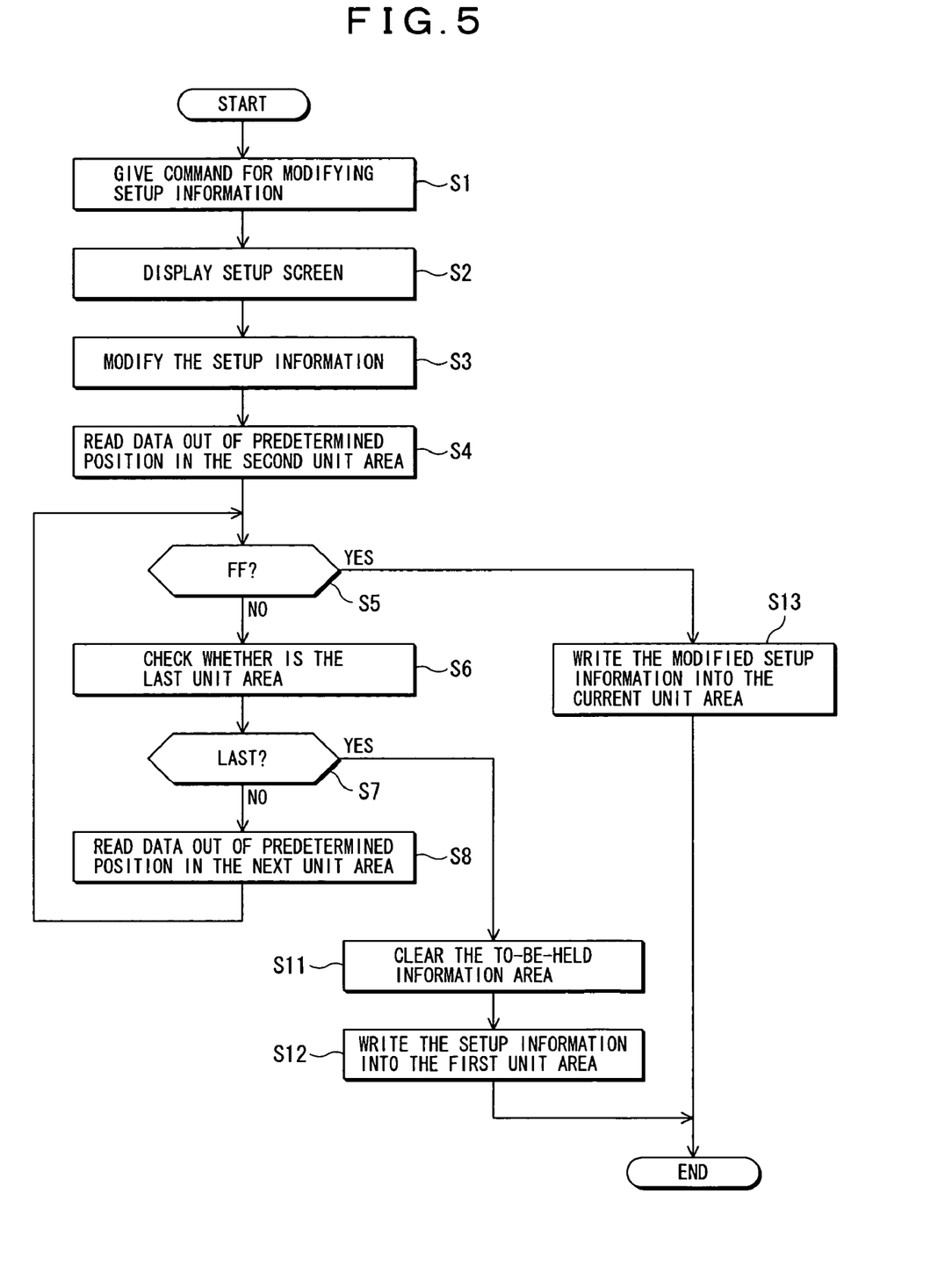
FIG. 5 is a flow chart showing a main operation of the embodiment when setup information is modified.

FIG. 5 is a flow chart showing a main operation of the embodiment when setup information is modified. The operation of the embodiment will be described with reference to FIG. 5 if necessary.

It is now assumed that only in the unit area "a1" of the to-be-held information area 142 is written setup information D1 as shown in FIG. 4 (A). In this state, when a user operates a setting key (step S1), the information management means 12 displays a screen for modifying settings (not shown in the figure) on the TV receiver 9 (step S2). Then, if the user modifies, for example, information concerning subtitle among the previous setup information, the information management means 12 modifies the setup information in accordance with the user's command (step S3).

Then, when the modification is finished, the information management means 12 reads data out of the head address of the unit area "a2" to check whether the value is FF in hexadecimal, that is, whether the unit area "a2" has already been provided with setup information (steps S4 and S5). In this case, since the data in the head address of the unit area "a2" is FF in hexadecimal, it is determined that no setup information is written in the unit area "a2". Consequently, the information management means 12 writes the modified setup information D2 into the unit area "a2" without erasing the setup information D1 that has already been written in the unit area "a1", as shown in FIG. 4 (B) (step S13). Therefore, the write processing of the setup information D2 can be finished in a short time with no control delay.

Also when setup information is modified again in accordance with the same operation as mentioned above (steps S1 to S3), the information management means 12 reads data out of the head address of the unit area "a2" to check whether the value is FF in hexadecimal, that is, whether the unit area "a2" has already been provided with setup information (steps S4 and S5). In this case, since the data in the head address of the unit area "a2" is not FF in hexadecimal, the operation shifts from step S5 to step S6 to check whether the unit area "a2" that has been subject to reading currently is the last unit area "an".

In the case above, if not the last unit area "an", the information management means 12 reads data out of the head address of the unit area "a3" that follows the unit area "a2" (steps S7 and S8) to check whether the value is FF in hexadecimal, that is, whether the unit area "a3" has already been provided with setup information (step S5). In this case, since the data in the head address of the unit area "a3" is FF in hexadecimal, it is determined that no setup information is written in the unit area "a3". Consequently, the information management means 12 writes the modified setup information D3 into the unit area "a3" without erasing the setup information D1 and D2 that have already been written, respectively, in the unit areas "a1" and "a2", as shown in FIG. 4 (C) (step S13). Therefore, the write processing of the setup information D3 can be finished in a short time with no control delay.

It is now assumed, as a result of multiple repetition of the above-described operation, that all unit areas up to the last unit area "an" of the to-be-held information area 142 have been provided with setup information. In this case, since the data in the head address of the last unit area "an" is also not FF in hexadecimal, the operation shifts from step S7 to step S11. Consequently, the information management means 12 clears the to-be-held information area 142, and then writes setup information into the unit area "a1" (step S12). Therefore, the state in the to-be-held information area 142 becomes equal to that shown in FIG. 4 (A).

Figure 6:
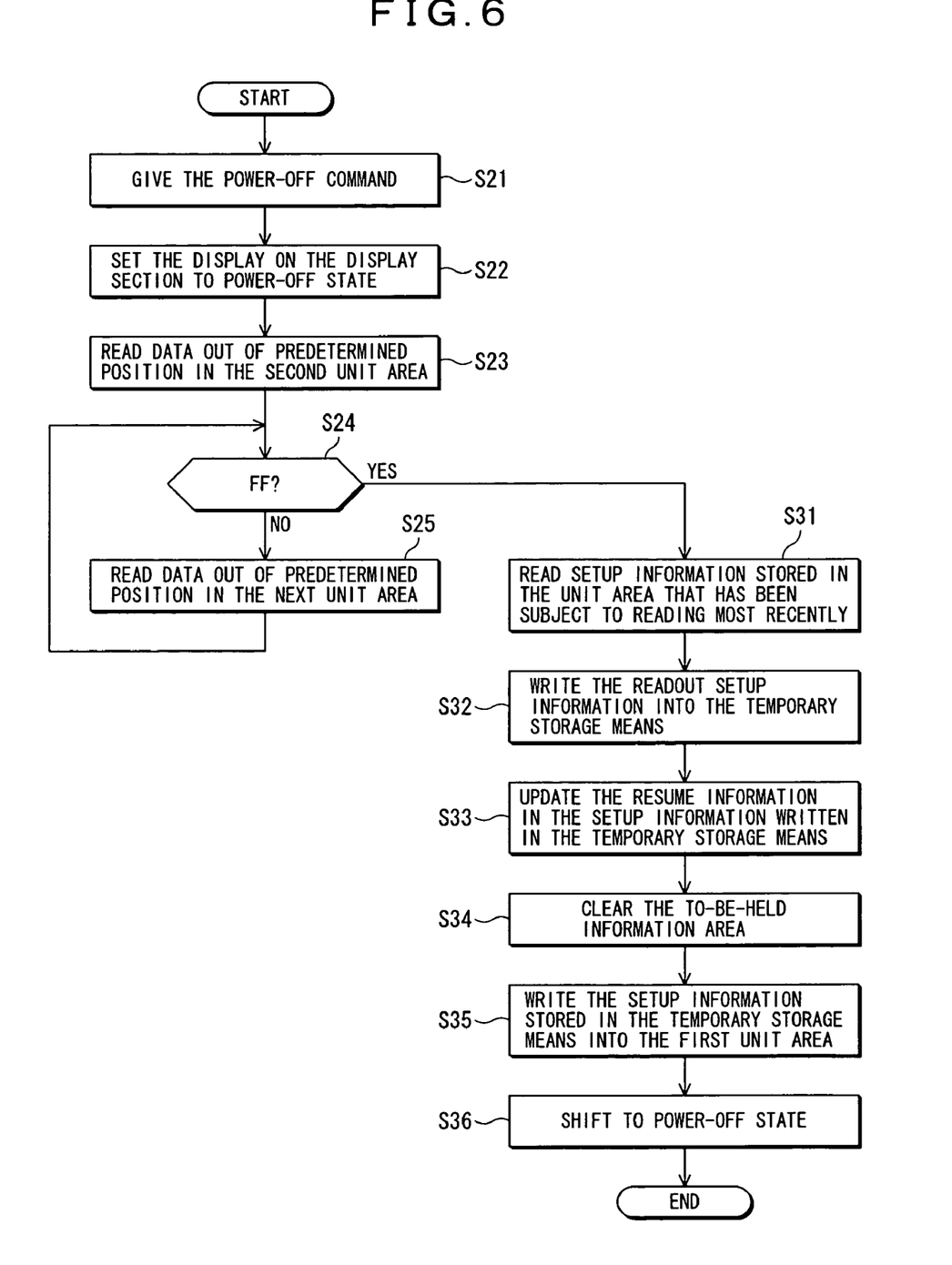
FIG. 6 is a flow chart showing a main operation of the embodiment when shifting from a power-on state to a power-off state.

FIG. 6 is a flow chart showing a main operation of the embodiment when shifting from a power-on state to a power-off state. The operation when shifting from a power-on state to a power-off state will be described with reference to FIG. 6.

It is now assumed that seven pieces of setup information D1 to D7 are written in the to-be-held information area 142 as shown in FIG. 4 (D). In this state, when a power key of the remote controller 4, etc. is operated (step S21), the control means 11 turns the display on the display section 6 from power-on state related one to power-off state related one to immediately make the device body seem to be in a power-off state in accordance with the operation given to the remote controller 4 (step S22).

Next, the area recovery means 13 reads data out of the head address of the second unit area "a2" to check whether the readout data is FF in hexadecimal (steps S23 and S24). In this case, since the readout data is not FF in hexadecimal, the operation shifts from step S24 to step S25 to read data out of the head address of the next unit area "a3". It is assumed that the operation of steps S24 and S25 is subsequently repeated, and then the data in the head address of the unit area "a8" is read out.

In the case above, since the readout data is FF in hexadecimal, the area recovery means 13 determines that setup information stored in the unit area "a7" that has been subject to reading most recently is the setup information last written in the to-be-held information area 142 by the information management means 12, and then reads the setup information D7 out of the unit area "a7" (step S31) to be written into the temporary storage means 15 (step S32). Then, the resume information in the setup information written in the temporary storage means 15 is replaced with the up-to-date resume information (which is stored in a predetermined area within the SRAM 15 by the control means 11 for each stop of the reproduction of the DVD 8) (step S33).

After the above-described operation is finished, the area recovery means 13 clears the to-be-held information area 142 (step S34). Next, the area recovery means 13 writes the setup information written in the temporary storage means 15 (the resume information has been updated) into the unit area "a1" (step S35). Therefore in the to-be-held information area 142, only in the unit area "a1" is written up-to-date setup information D11, while the other unit areas "a2" to "an" include no information, as shown in FIG. 4 (E). That is, it is possible to write setup information one after another, when modified, without clearing the to-be-held information area 142.

Subsequently, the control means 11 controls the power supply section 5 to stop supplying parts other than required for receiving the key switch operation of the input circuit section 3 and the remote controller 4 with operating power to provide a power-off state (step S36).

It is noted that the present invention is not restricted to the above-described embodiment, where the case applied to a DVD player is described, but may be applied similarly to cases employing other device configurations (e.g. TV receiver and DVD recorder) if to-be-held information required to be kept even in a power-off state is used.

What is claimed is:

1. A DVD player comprising:
    a flash memory in which a to-be-held information area divided into a plurality of unit areas for storing a plurality of offset information, the content of which is required to be held even in a power-off state, is provided, said unit areas being ordered in a predetermined direction in either ascending or descending order of address;
    a temporary memory for storing data temporarily;
    an input section to which a user's command is given;
    a control section in which said flash memory and said temporary memory are incorporated for controlling the entire device based on a command from said input section; and
    a power supply section for supplying said input and control sections with driving power by using a commercial power supply as the primary power supply,
    said control section having:
    information management means for managing information such that, for each time when modification of setup information is finished based on the command given from said input section, data is successively read out for the unit areas of said to-be-held information area in said predetermined direction, upon reading out of data indicating a cleared state, the unit area in which the data is read out is determined to be a free unit area in which no information is stored, and the modified setup information is successively written into the free unit area within said to-be-held information area without erasing setup information that has already been stored in said to-be-held information area;
    control means for controlling such that, when a command for power-off is given from said input section, said power supply section is controlled for supplying only said input section and a part of said control section with operating power to set a standby state; and
    area recovery means for reading out and writing information such that, upon the standby state, data is successively read out for the unit areas of said to-be-held information area in said predetermined direction, upon reading out of data indicating a cleared state, the unit area in which the data is read out is determined to be a free unit area in which no information is stored, setup information stored in the unit area immediately before the determined free unit area is read out to be written into said temporary memory, and then all the data in said to-be-held information area is cleared, and the setup information read out from said temporary memory is written into a head unit area of said to-be-held information area in said predetermined direction, wherein
    said control means controls said power supply section to set the power-off state after the data is written into the head unit area by said area recovery means.

2. The DVD player according to claim 1, wherein said area recovery means provides control to replace resume information in the setup information read out from said temporary memory with up-to-date resume information stored in said temporary memory by said control means, and then writes the setup information in the head unit area of said to-be-held information area in said predetermined direction.

3. An electronic device comprising:
    a flash memory in which a to-be-held information area divided into a plurality of unit areas for storing a plurality of to-be-held information, the content of which is required to be held even in a power-off state, is provided, said unit areas being ordered in a predetermined direction in either ascending or descending order of address;
    a temporary memory for storing data temporarily;
    an input section to which a user's command is given;
    a control section in which said flash memory and said temporary memory are incorporated for controlling the entire device based upon a command from said input section; and
    a power supply section for supplying said sections with driving power by using a commercial power supply as the primary power supply,
    said control section having:
    information management means for managing information such that, for each time when modification of to-be-held information is finished based on the command given from said input section, data is successively read out for the unit areas of said to-be-held information area in said predetermined direction, upon reading out of data indicating a cleared state, the unit area in which the data is read out is determined to be a free unit area in which no information is stored, and the modified to-be-held information is successively stored into the free unit area without erasing setup information that has already been stored in said to-be-held information area;

control means for controlling such that, when a command for power-off is given from said input section, said power supply section is controlled for supplying only said input section and a part of said control section with operating power to set a standby state; and area recovery means for reading out and writing information, such that, upon the standby state, data is successively read out for the unit areas of said to-be-held information area in said predetermined direction, upon reading out of data indicating a cleared state, the unit area in which the data is read out is determined to be a free unit area in which no information is stored, to-be-held information stored in the unit area immediately before the determined free unit area is read out to be stored in said temporary memory, and then all the data in said to-be-held information area is cleared, and the to-be-held information read out from said temporary memory is written into a head unit area of said to-be-held information area in said predetermined direction, wherein said control means controls said power supply section to set the power-off state after the data is written into the head unit area by said area recovery means.

4. The electronic device according to claim 3, wherein said information management means controls to (1) successively read out data for the unit areas of said to-be-held information area in said predetermined direction, for each time when the readout data is determined not to indicate the cleared state, (2) determine whether or not the unit area is the last unit area of said to-be-held information area in said predetermined direction, and (3) when the unit area is determined to be the last unit area, without reading out the data indicating the cleared state, clear all the data in said to-be-held information area and then write the modified to-be-held information into the head unit area of said to-be-held information area in said predetermined direction.

* * * * *